June 29, 1965 P. H. SCHRADER 3,191,774
CLOG FREE SCREENING MECHANISM
Filed June 18, 1957 6 Sheets-Sheet 1
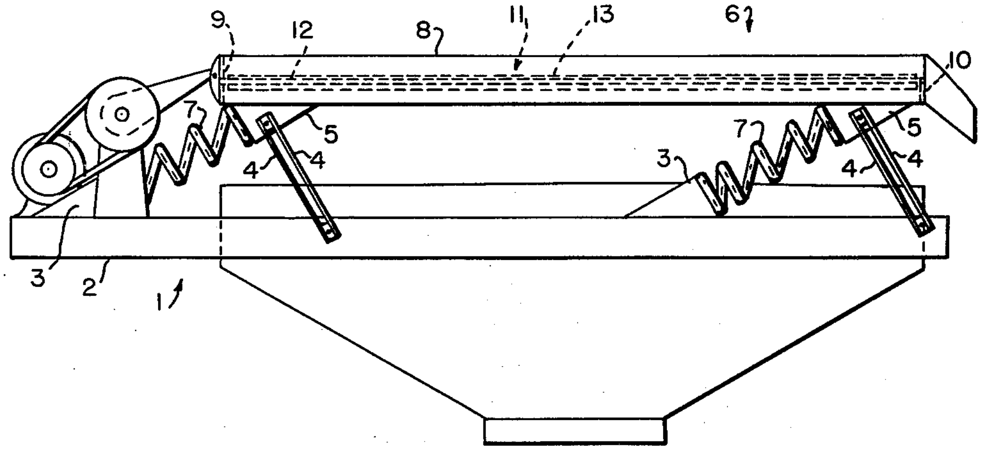
Fig. I
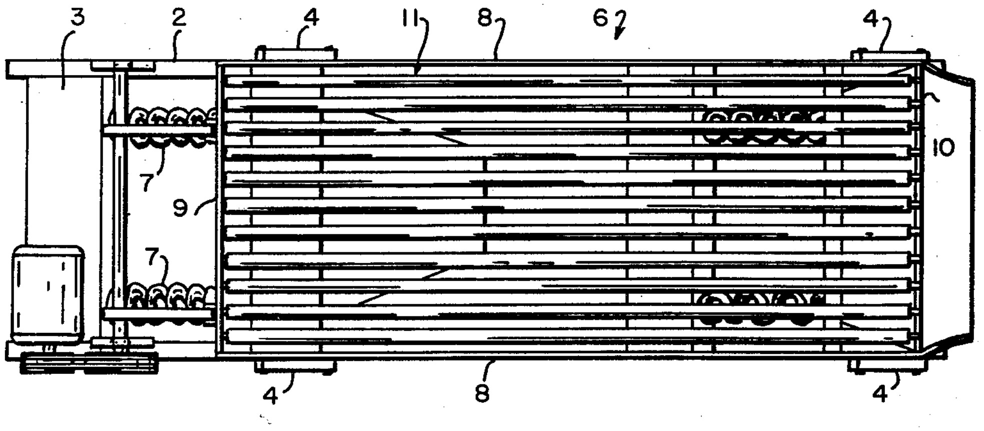
Fig. II
INVENTOR.
PRESTON H. SCHRADER
BY
Marshall, Marshall & Yeasting
ATTORNEYS

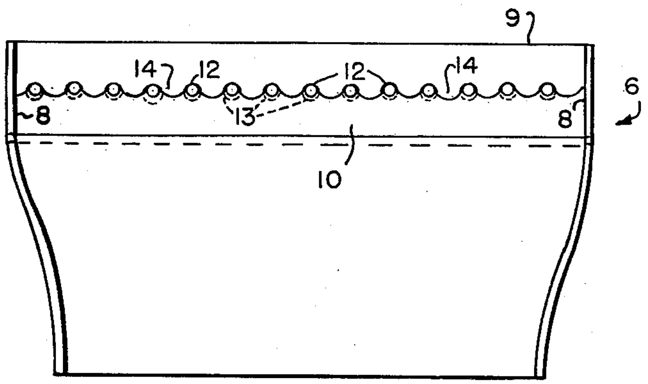
Fig. III
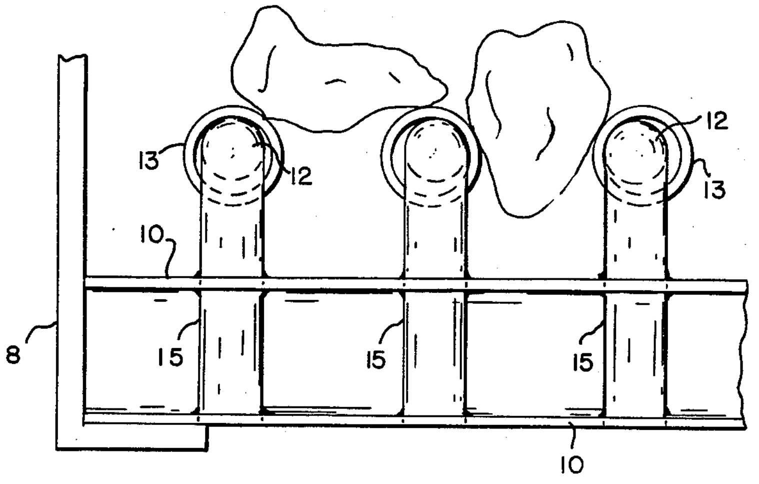
Fig. IV
INVENTOR.
PRESTON H. SCHRADER
BY
Marshall, Marshall & Yeasting
ATTORNEYS June 29, 1965 P. H. SCHRADER 3,191,774
CLOG FREE SCREENING MECHANISM
Filed June 18, 1957 6 Sheets-Sheet 3
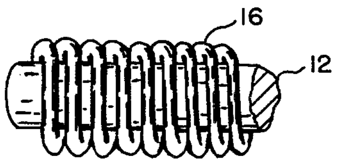
Fig. V
Fig. VI
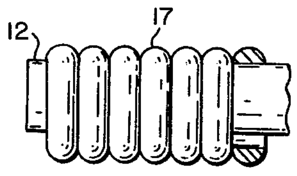
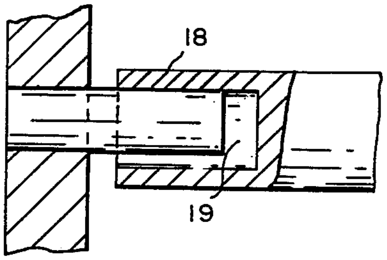
Fig. VII
Fig. VIII
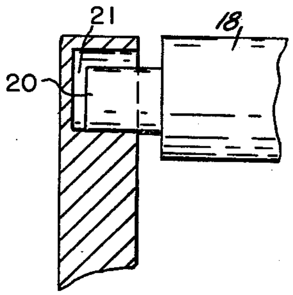
INVENTOR.
PRESTON H. SCHRADER
BY
Marshall, Marshall & Yeasting
ATTORNEYS June 29, 1965 P. H. SCHRADER 3,191,774
CLOG FREE SCREENING MECHANISM
Filed June 18, 1957 6 Sheets-Sheet 4
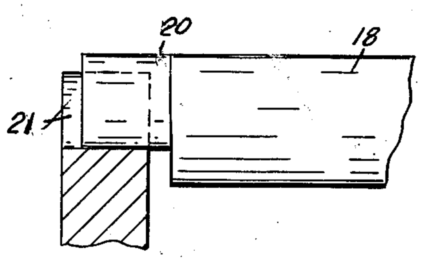
Fig. IX
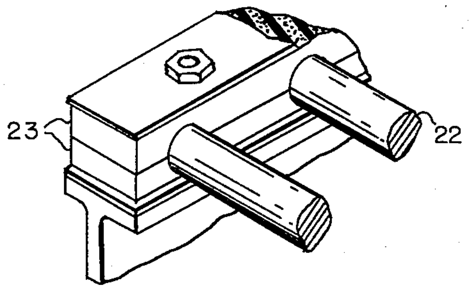
Fig. X
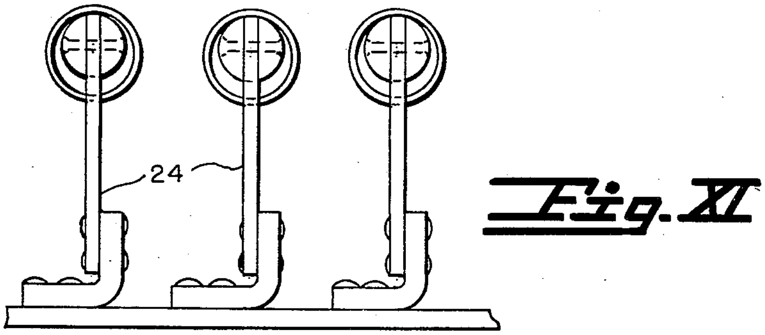
Fig. XI
INVENTOR.
PRESTON H. SCHRADER
BY
Marshall, Marshall & Yeasting
ATTORNEYS

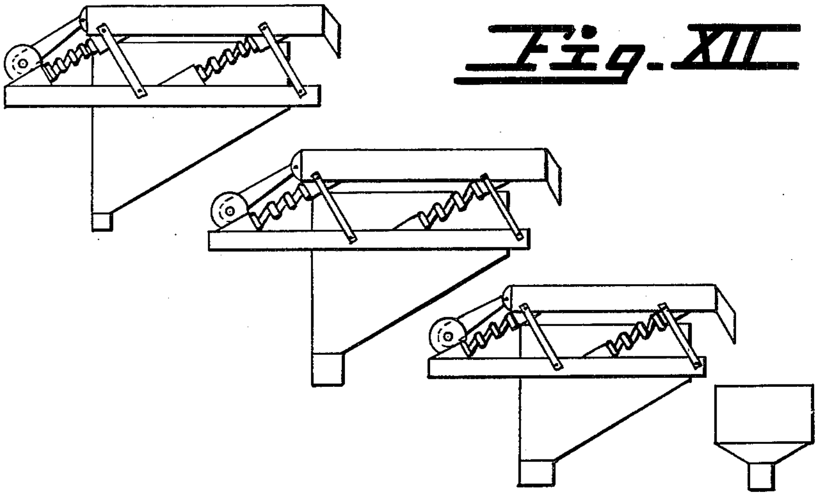
Fig. XII
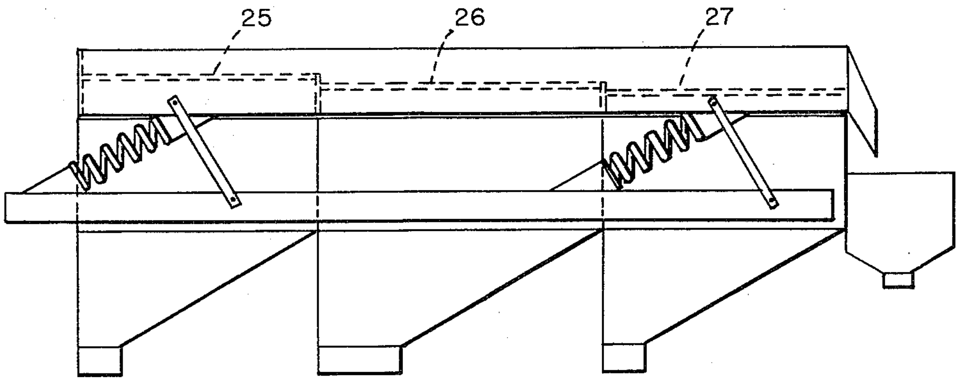
Fig. XIII
INVENTOR.
PRESTON H. SCHRADER
BY
Marshall, Marshall & Yeasting
ATTORNEYS June 29, 1965 P. H. SCHRADER 3,191,774
CLOG FREE SCREENING MECHANISM
Filed June 18, 1957 6 Sheets-Sheet 6
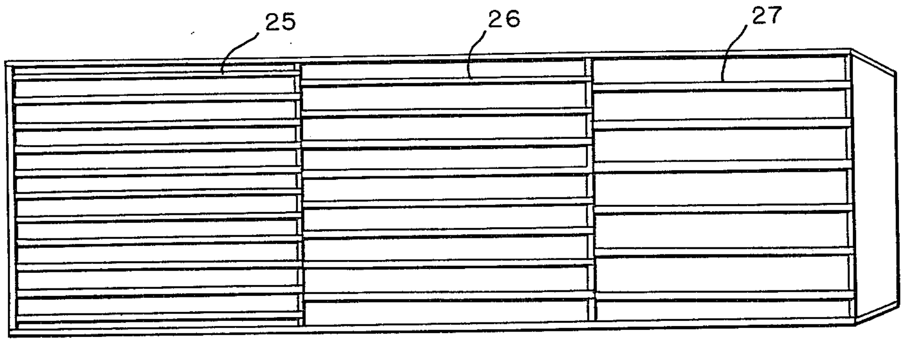
Fig. XIV
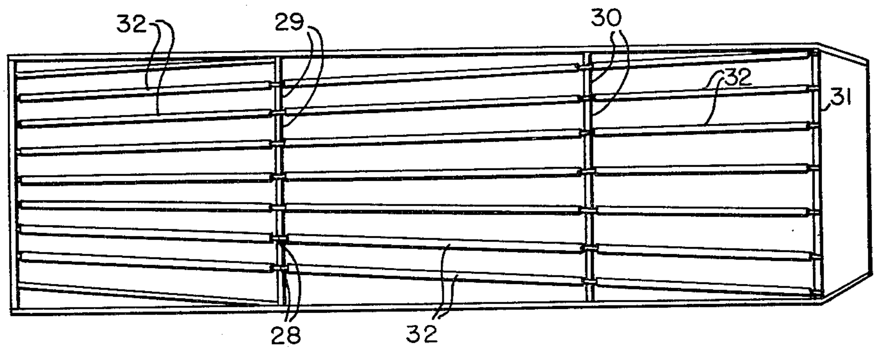
Fig. XV
INVENTOR.
PRESTON H. SCHRADER
BY
Marshall, Marshall & Yeasting
ATTORNEYS

3,191,774
CLOG FREE SCREENING MECHANISM

Preston H. Schrader, Louisville, Ky., assignor, by mesne assignments, to Rex Chainbelt Inc., a corporation of Wisconsin Filed June 18, 1957, Ser. No. 666,342
7 Claims. (Cl. 209—329)

This invention relates to vibratory screens having grids with transversely spaced longitudinally extending elongated members or bars. Such screens are known in the mining industry as "grizzlies," while in the produce business they sometimes are called "graders." When a grid with spaced bars carrying pieces of coal or ore of miscellaneous sizes is vibrated the fines and the smaller pieces fall between the spaced bars while the pieces that are too large to pass between the bars travel over the grid. The grid may be nearly level and may be vibrated with impulses like those imparted to so-called "directional throw" vibratory conveyors, the pieces being moved over the grid by rapidly repeated miniature tosses.

Frequently an article or piece which is too large to fall between the bars will become wedged in a space between them and vibration will fail to shake the piece through or shake it back out of the grid. Such jamming of chunks between the bars is known in the trade as "blinding." Similar jamming often occurs in grids with spaced bars carrying produce or other nearly uniform articles to be graded.

It is an object of this invention to provide vibratory screening mechanism having grids of spaced elongated members in which liability of wedging of articles between the spaced elongated members is avoided or minimized.

It is a further object to provide vibratory screening mechanism having grids of spaced bars which are capable of moving apart to an extent sufficient to free articles that otherwise might clog the screens.

A further object is to provide vibratory screening mechanism which functions with lower vibration intensity than has heretofore been required to avoid wedging and consequently is less liable to bruise or damage fruits and other produce.

A further object is to provide vibratory screens having spaced bars which are capable of being temporarily pushed or shaken further apart to avoid blinding but which are biased to return to predetermined spacing after wedged articles are dislodged.

It is a further object to provide vibratory screens having bars, the adjacent sides of the bars being capable of temporarily swinging apart to avoid clamping pieces or units of commodities between the bars, thus to prevent such pieces from becoming wedged between the bars, the normal spacing of the bars being restored by the action of gravity upon dislodgement of such pieces or units.

And a further object is to provide vibratory screens having composite bars with pendulous components, the adjacent sides of said composite bars being capable of being temporarily pushed or shaken apart and being yieldingly maintained with proper spacing by the action of gravity upon said pendulous components.

Other objects and advantages will be apparent upon perusal of the following specification illustrated by the accompanying drawings in which:

FIG. I is a view in elevation of a grizzly embodying this invention;

FIG. II is a plan view of the grizzly illustrated in FIG. I;

FIG. III is an enlarged elevational view showing the delivery end of the grizzly illustrated in FIG. I;

FIG. IV is further enlarged fragmentary elevational view of the delivery end of a modified form of grizzly showing pieces of material thereon;

FIGS. V, VI, VII, VIII, IX and X are fragmentary views partly in section showing modifications;

FIG. XI is a fragmentary elevational view showing still another modification;

FIG. XII is a side elevational view showing a series of screens;

FIG. XIII is a side elevational view showing a grader embodying the invention;

FIG. XIV is a plan view of the grid of the grader shown in FIG. XIII;

FIG. XV is a plan view showing a modified form a grid.

These drawings and the following specification illustrate and describe preferred forms of the invention but they are not intended to limit its scope.

The form of grizzly illustrated in FIG. I is mounted on a stationary base 1 consisting of a pair of longitudinally extending rails 2 connected by gable-shaped cross members 3 which are fixed to the rails 2. Connected to each of the rails is a series of flat springs 4 which are arranged in pairs and which extend upwardly and rearwardly with respect to the direction of travel of the commodity to be screened. The upper ends of the pairs of flat springs 4 are fixed to transversely extending trough-shaped members 5 which carry a vibratory screening or sorting frame 6. The screening or sorting frame 6 is supported at each side by heavy helical springs 7 which are interposed between gable-shaped cross members 3 and the trough-shaped screen carrying members 5. The construction outlined above incorporates a well known type of vibratory conveyor mechanism in which a screening or sorting frame has been substituted for a conveyor pan.

The screening or sorting frame comprises angle form side rails 8 connected adjacent their receiving ends by a back cross beam 9 and connected adjacent their delivery ends by a delivery cross beam 10, the side rails 8 being securely and rigidly fixed to the cross beams 9 and 10 by welding or otherwise. Preferably the cross beams 9 and 10 are angle form in section. They may however be inverted T-shaped or they may simply be plates. Whatever their shapes the upper edge of the delivery cross beam 10 should be below the upper edge of the back cross beam 9 and the side rails 8 which should be high enough to prevent the commodity from spilling over them.

Extending between the cross beams 9 and 10 are composite bars 11 the cores of which are round rods 12 which may be attached to the cross beams in any preferred manner, several forms of attachment being shown in the drawings. In the form of attachment illustrated in FIG. III the upper edge of the delivery cross beam 10 is notched at intervals corresponding to the desired spacing of the delivery ends of the round rods 12. The notches preferably are semi-circular and of such size that the ends of the round rods 12 fit into them, the ends of the rods being securely welded in place. The receiving ends of the rods are fitted into properly spaced holes in the cross beam 9 and securely welded in place. If desired, the ends of the rods 12 may be slightly reduced or grooved and the notches in the cross beam 10 made to fit the reduced or grooved ends to facilitate assembly and to make strong joints.

Before the rods 12 are assembled with the cross beams a tube 13 is slipped over each rod. The inside diameter of the tubes 13 is somewhat greater than the outside diameter of the rods 12. If, for example, the outside diameter of the rods 12 is ½" the inside diameter of the tubes 13 may be ⅝". The difference between the inside diameter of the tubes and the outside diameter of the rods will vary with size of the apparatus and the nature of the commodity to be screened. Usually it will depend upon the "go-no go" tolerance to which the pieces or units are to be graded. The length of the tubes 13 should be a small fraction of an inch, e.g. ¼″, less than the distance between the cross beams 9 and 10 so that when the screening frame 6 is vibrated the tubes 13 may jiggle and dance as well as swing toward and away from each other to permit the escape of any lump or unit of commodity that might otherwise become lodged between the tubes.

Although the units or pieces of commodity usually will be above the upper edge of the cross beam 10 over which they are to pass, cutouts 14 can be made between the notches to permit the exit of any piece that may have an appendage hanging below the level of the upper edge of the cross beam (see FIG. III). Alternatively the delivery ends of the rods may be bent downwardly to form stilts 15 (see FIG. IV) which are securely and rigidly anchored to the delivery cross beam. The feature that is common to the delivery end mountings of the bars as illustrated in FIGS. III and IV, and to the mountings as illustrated in FIGS. IX and XI as well, is the unobstructed delivery space between the tops of the bars.

Where the invention is incorporated in a grizzly for handling heavy hard material the sheaths or tubes 13 that surround the rods may be made of hardened steel. Where the material is light and soft the sheaths or tubes 13 may be made of extruded plastic, or where the commodity is liable to damage by bruising they may be made of lengths of rubber, or rubbery, hose. In some cases the sheaths may be helical springs 16, either naked or covered by rubber or plastic, stretched longitudinally over the tubes to handle delicate commodities more gently and to reduce operating noises (see FIG. V). It even is practicable to string beads, washers or other annuli 17 loosely upon the rods to function as sheaths (see FIG. VI).

In some circumstances tubes, or solid rods 18 with sockets 19 in their ends, can be mounted loosely on stub shafts fixed to and projecting horizontally from the cross beams instead of the full length rods (see FIG. VII). Or rods or tubes or trunnions 20 projecting from their ends can be loosely mounted in openings or sockets 21 in the cross beams (see FIG. VIII). In the mounting illustrated in FIG. IX the trunnions 20 are eccentric so that the centers of mass of the rods can swing around the turning axes of the trunnions. The eccentric trunnions can fit the openings or sockets 21 rather closely it being only necessary in such case for them to act as pivots.

Where it is desirable to minimize noise rods or tubes 22 or trunnions projecting from their ends may be clamped in rubber or rubbery keepers 23 mounted along the cross beams (see FIG. X). A relatively silent construction also can be made by fixing the ends of the rods or tubes at the upper ends of flat springs 24 (see FIG. XI). Mounting the rods in rubbery keepers or on springs does not preclude surrounding the rods with sheaths that rotate freely about the longitudinal axes of the tubes for easy release of anything that may be caught between them. Where resiliently mounted rods carry rotatable tubes however the tubes may fit the rods more closely than they should fit when carried by rigidly mounted rods.

In sorting soft commodities such as onions by vibratory screens with rigid bars, clogging may be reduced in some instances by employing vibration of high intensity but the employment of sufficient intensity to significantly reduce clogging is liable to bruise and otherwise damage delicate produce. Even with rigid hard metal tubes or rods engaging delicate produce it is not injured by vibratory screening with the device of this invention, which avoids clogging at comparatively low vibratory intensities.

A series of single screens such as are illustrated in FIGS. I and II can be arranged in echelon so that product will pass from the discharge end of one screen of the series onto the receiving end of the next screen of the series. Each of the screens may be operated by its own motor and impulse imparting device, in the manner shown in FIG. XII and even mounted on a separate base, or all of the screen frames of a series may be fixed together and operated by a motor and impulse imparting device which is common to all of the screens.

Alternatively a series of grids may be mounted upon a single sorting frame in substantially the same plane, or in planes that are only slightly offset in the manner shown in FIGS. XIII and XIV. The successive grids 25, 26 and 27 of the series may differ from each other in that the rods are spaced progressively farther apart so that fruit or other commodity which does not fall through the first grid 25 will travel onto the second grid 26, fruit that does not fall through the second grid 26 will travel onto the third grid 27 and so forth, the largest fruit finally pouring off of the discharge end of the machine.

In the forms of the device so far described the rods may be parallel although it is preferable that they diverge slightly from the receiving end toward the discharge end of each grid. Such divergence is not intended to sort fruit or other commodities into more than one grade in passing over any single grid but is intended to cooperate with vibration and swinging and jiggling of tubes or rods in getting loose any fruit that might otherwise blind. Under the influence of vibratory movement of the grid the fruit tends to be tossed toward the portions of the tubes and rods which are slightly farther apart. It is also advisable to have the grid slope downwardly slightly toward the discharge end to further the tendency of the commodity to move toward the portions of the rods that are farther apart.

In FIG. XV is illustrated a form of the device which depends upon the fanning out of rods 28 and tubes to accomplish grading. As illustrated this form of device has a series of cross beams over which continuous rods extend, the receiving ends of the rods being more closely spaced than the discharge ends of the rods. The rods 28 are mounted on the cross beams 29, 30 and 31 in substantially the same manner as that in which the rods 12 in FIG. III are mounted, but the tubes 32 are discontinuous, there being separate sets of loosely hung tubes between the successive cross beams. In the forms of the device illustrated by FIGS. XIII, XIV and XV several hoppers are placed beneath the sorting grid with one hopper under the discharge end of the grid, there being as many hoppers as there are grades to be separated.

In summary of the invention, it involves a screening mechanism which also conveys material without clogging by virtue of a directional throw conveying drive applied to a screen made up of a plurality of elongated members having longitudinal axes generally paralleling the conveying direction. The screen is arranged with a nominal spacing between members which is expansible within limits to release bodies which might otherwise become bound between the members. A number of forms of elongated grid members have been shown all of which have journaled couplings to a common support or frame to enable the members to rotate and shift transversely with respect to each other. The journals of these couplings can be integral with the grid members as the hollow interiors of tubes as in FIG. IV, the bores 19 in the ends of rods as in FIG. VII, the interior diameters of helices as in FIG. V, or the inner diameters of series of annuli as in FIG. VI. Such circular journals have their axes at the center of their cross section and perpendicular thereto. Alternatively, the journals can be on the support member as the sockets 21 of FIG. VIII or the cradles of FIG. IX. The journaled elements cooperating with the journals can be on the common support as the rods 12 in FIGS. IV, V and VI or the studs of FIG. VII. They can also be integral with the elongated members as the trunnions 20 of FIGS. VIII and IX. The cooperative relationship between each journal and journaled element to constitute journal couplings is such that the journaled element can rotate within its journal. The members are each so constructed that their longitudinal axes and centers of mass are below the axis about which they rotate so that the members are urged to a given transverse spacing by gravity but are freed from gravity during portions of the directional throw so that they may alter their spacing to release any bound articles.

Some of the features which are described above are alternative. Each feature or its alternate cooperates in the combination with other features in mutual contribution toward the attainment of the objects of the invention. It is to be understood that the devices described above and shown in the accompanying drawings are illustrative only and that the invention to be protected hereby is subject to modification within the spirit and scope of the subjoined claims.

I claim:

1. Screening mechanism comprising, in combination, a plurality of elongated grid members extending in the same general direction and lying along a common plane, a common support for said grid members, a journaled coupling between each grid member and said support, a journal for each coupling located within the grid member and having a given inside diameter, a journaled element for each coupling secured to the common support and fitted into its respective journal and of substantially less outside diameter than the given diameter of its cooperating journal, each cooperating journal being free to rotate with respect to its journaled element to permit the grid member associated therewith to rotate and be freely shiftable transverse of its axis within limits defined by the difference between the inside diameter of said journal and the outside diameter of said journaled element, each journaled element having its axis displaced vertically from the axis of said journal to support said grid member pendulously whereby adjacent sides of said elongated grid members are held yieldably at predetermined separations, and directional throw means for vibrating said elongated grid members with an acceleration having a vertical component opposed to and exceeding the acceleration of gravity during at least one portion of the vibrating cycle to facilitate shifting of said members and prevent blinding as well as to convey material thereover in a direction generally paralleling the longitudinal axis of said members.

2. The mechanism defined in claim 1 in which ends of the elongated members are longitudinally yieldably mounted.

3. Vibratory screening mechanism comprising, in combination, a plurality of elongated grid members extending in the same general direction and lying along a common plane, a common base for said grid members, said grid members each being composite and consisting of a round core having a given outer diameter mounted upon said base and a sheathing surrounding each core and having an inner diameter substantially greater than the outer diameter of said core, whereby the sheathing is freely shiftable transversely of the core, means which yieldably holds adjacent sides of said sheathing spaced at predetermined distances and directional throw means for vibrating said base member with an acceleration having a vertical component opposed to and exceeding the acceleration of gravity during at least one portion of the vibrating cycle to facilitate shifting of the sheathing and prevent binding of material therebetween as well as to convey material thereover in a direction generally paralleling said grid members.

4. The mechanism defined in claim 3 in which the elongated members are composite and consist of cores surrounded by sheathing which is composed of discrete annuli.

5. The mechanism defined in claim 3 in which the elongated members are composite and consist of rigid cores loosely surrounded by sheathing which is composed of helical springs.

6. Vibratory screening mechanism comprising a grid of bars extending in the same general direction and spaced at predetermined normal distances from each other, said bars being composite structures consisting of rods having given outer diameters surrounded by sheathing, said sheathing being in the form of round tubes having inner diameters substantially greater than said given outer diameters of the rods which they surround, the lengths of said tubes being slightly less than the lengths of said rods, the adjacent sides of juxtaposed bars being capable of limited movements away from each other to increase the normal spacing between them, said bars having pendulous portions, means yieldingly maintaining normal spacing between said bars by utilizing the action of gravity upon the pendulous portions of said bars, said bars being normally spaced farther apart at one end of said grid than at the other end of said grid, and directional throw means for vibrating said grid with an acceleration having a vertical component opposed to and exceeding the acceleration of gravity during at least one portion of the vibrating cycle so as to facilitate such limited relative movements of adjacent sides of said juxtaposed bars and so as to cause commodities to be conveyed thereover toward the end of said grid at which said bars are spaced farther apart.

7. Vibratory screening mechanism comprising a grid of bars extending in the same general direction and normally spaced at predetermined distances from each other, said bars being composite structures consisting of rods having given outer diameters surrounded by sheathing, said sheathing being in the form of round tubes having inner diameters substantially greater than said given outer diameters of the rods which they surround, the lengths of said tubes being slightly less than the lengths of said rods, the adjacent sides of juxtoposed bars being capable of limited movements away from each other to increase the normal spacing between them, said bars having pendulous portions, means yieldingly maintaining such normal spacing by utilizing the action of gravity upon the pendulous portions of said bars, and directional throw means for vibrating said grid with an acceleration having a vertical component opposed to and exceeding the acceleration of gravity during at least one portion of the vibrating cycle so as to facilitate such limited relative movements of adjacent sides of said juxtaposed bars and so as to cause commodities to be conveyed thereover.

References Cited by the Examiner

UNITED STATES PATENTS

| | | | |
|---|---|---|---|
| 553,817 | 1/96 | Walker | 209—14 |
| 781,493 | 1/05 | Clements et al. | 209—393 X |
| 900,993 | 10/08 | Fanton | 209—393 X |
| 1,185,770 | 6/16 | Cody | 209—393 |
| 1,636,227 | 7/27 | Grabill | 209—401 X |
| 1,823,126 | 9/31 | Ross | 209—393 X |
| 2,139,380 | 12/38 | Norris | 209—401 |
| 2,251,586 | 8/41 | Flint | 209—329 X |
| 2,378,499 | 6/45 | Rapp | 209—329 X |
| 2,600,508 | 6/52 | Lehman et al. | 209—393 X |

FOREIGN PATENTS

| | | |
|---|---|---|
| 61,777 | 10/13 | Austria. |
| 597,598 | 3/25 | France. |
| 1,042,243 | 6/53 | France. |
| 317,326 | 12/19 | Germany. |
| 940,084 | 3/56 | Germany. |
| 706,358 | 3/54 | Great Britain. |

HARRY B. THORNTON, *Primary Examiner.*

CARL F. KRAFFT, HERBERT L. MARTIN, ROBERT A. O'LEARY, EDWARD J. MICHAEL, *Examiners.*